United States Patent [19]
Ryan

[11] 3,858,173
[45] Dec. 31, 1974

[54] SENSOR OF VEHICLE LOAD OR OVERLOAD

[76] Inventor: Ward H. Ryan, 2146 Virginia Ave., Phoenix, Ariz. 85009

[22] Filed: June 1, 1973

[21] Appl. No.: 366,086

[52] U.S. Cl................ 340/52 R, 340/272, 200/85
[51] Int. Cl. ........................................ G08b 21/00
[58] Field of Search............... 340/52 R, 266, 272; 200/85

[56] References Cited
UNITED STATES PATENTS
2,769,967  11/1956  Lukocevich...................... 340/52 R
2,779,013  1/1957  Chotro............................ 340/52 R Primary Examiner—Alvin H. Waring

[57] ABSTRACT

A sensor of vehicle load or overload actuates an indicia, indicative of the tractor or truck bed, behind a prime mover, arriving at, or being under, a state of predetermined load or overload. This state of load or overload is indicated by circuit closure between two contacts, the contact carriers of the respective contacts being so mounted, with relation to the load supporting area of vehicle, as trailer or truck bed, and supporting frame therebelow, that, as such area and frame are urged downwardly, responsive to load placed thereon, the contact carriers are adapted to respond to such descent of load supporting area and frame, in such manner as to permit contact closure.

11 Claims, 2 Drawing Figures

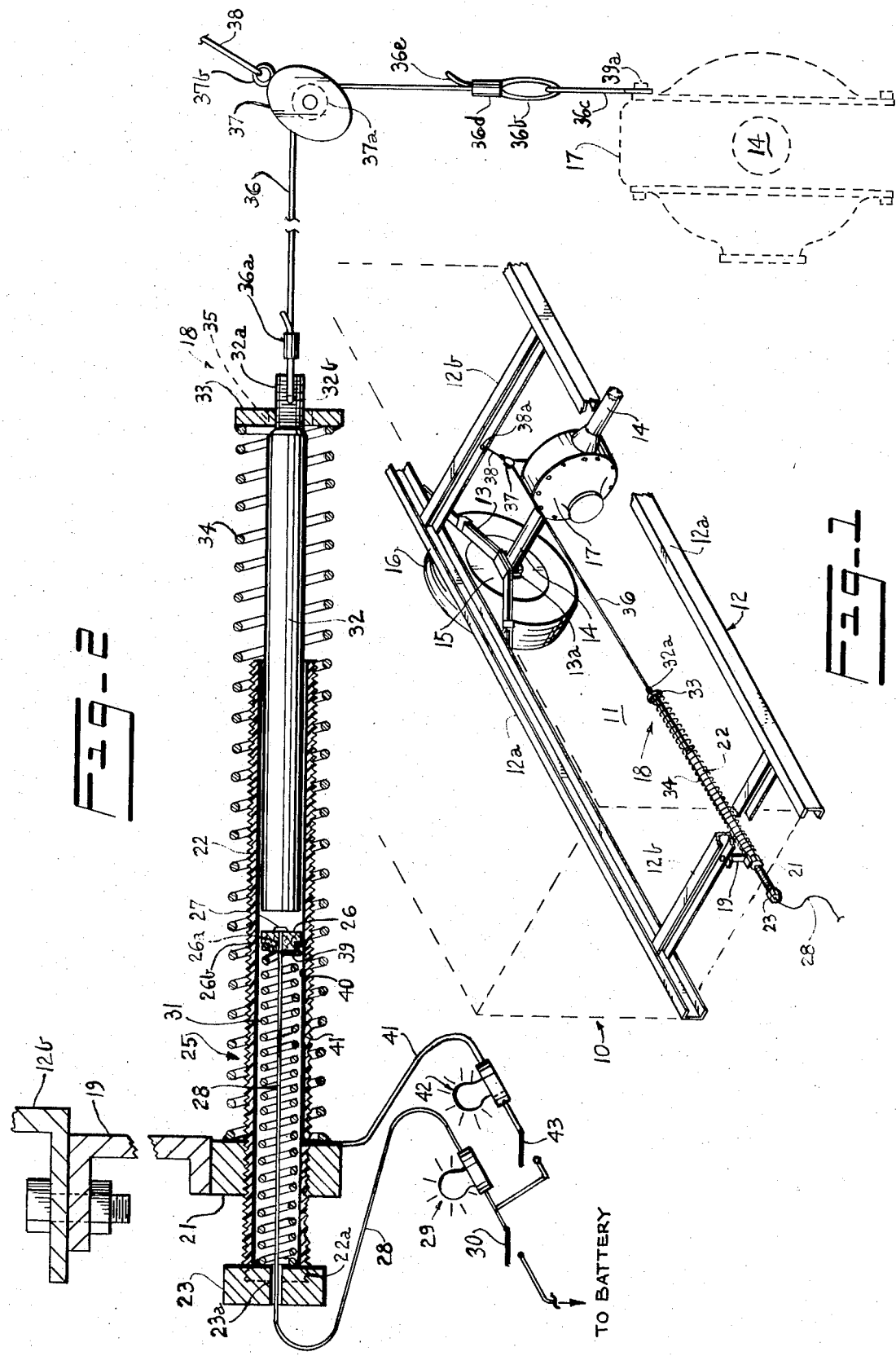

SENSOR OF VEHICLE LOAD OR OVERLOAD

BACKGROUND OF THE INVENTION

The invention differs substantially from the sensor or indicator of Roach U.S. Pat. No. 2,842,633, issued July 8, 1958, which requires a member rigidly welded, or otherwise rigidly connected, to the truck differential through which an axle passes, at least in part, in journal relationship. Such member is fixed to the lower of two complex lever assemblies that cooperate in a box or housing that is suspended from the leaf spring supported frame that supports the load supporting area of the vehicle.

The invention also differs substantially from the vertically intertelescoped tubular construction type devices as disclosed in Chotro U.S. Pat. No. 2,779,013, issued July 22, 1957, and in Borgstede U.S. Pat. No. 3,646,512, issued Feb. 29, 1972. These devices carry their circuit closing contacts within an intertelescoped interior, (Borgstede), or to arc exteriorly between a raised ridge on one tube as one contact moving in a groove in the other tube that is crossed over by uninsulated enwrapping wires (Chotro).

All of the prior art patents heretofore employed have stretched into complexities of design without arriving at simplicity of calibration whereas the instant invention solves these complexities simply by mounting one tubular member horizontally in, and adjustably with relation to, the leaf spring supported frame of the vehicle, with a rod member intertelescoped into the horizontal tube as the ground contact in itself. Also the necessity for universal joint connection in view of the relative movement in three planes between the load and parts thereunder in the course of transit, is eliminated in the invention of the applicant by the simple expedient of passing a cable, connected at one end to the ground contact, over a frame suspended pulley to be anchored at its other end on an conventional part, as a nut on the truck differential through which an axle passes, at least in part, in journal relationship.

In addition to the advantages hereinabove described, the simplicity of construction of this invention offers several ways of calibration, each of equal ease of accessibility. Also, the invention offers choice of at least two positive ground paths.

SUMMARY OF THE INVENTION

This invention relates to a sensor or indicator of load or overload on a load supporting area, as of a trailer or truck bed, that is leaf spring supported above vehicle axle means, the leaf springs contracting under load so that electrical contact is established between contacts that move relatively together responsive to the imposition of load up to, or in excess of a predetermined maximum load, to be carried by the load supporting area.

As a primary object the invention provides a sensor or overload indicator that provides a first contact in a horizontally disposed, frame mounted contact carrier while the second contact telescopes into the first contact carrier and has its motion spring-urged toward circuit closure responsive to downward movement of the load supporting area toward a conventional transverse, wheel supported axle, as reflected by movement of a cable connected at one end to the second contact, passed over a frame suspended pulley, and anchored to structure at elevation fixed with relation to axle elevation.

It is also an object of this invention to provide a load sensor or overload indicator of this class, which requires no second contact carrier other than the base of the tension spring that urges the second contact toward circuit closure as yieldably released for such movement responsive to load supporting area frame downward movement under added load.

BRIEF DESCRIPTION OF THE FIGURES

The salient and pertinent features of a preferred embodiment of the invention are shown in the drawings, in which FIG. 1 is a fragmentary, isometric view of a frame, with means providing load supporting area, as trailer body, indicated upon the frame in broken lines, and with the sensor comprising the invention shown extending longitudinally centrally of the frame; and FIG. 2 is a longitudinally extending sectional elevational view of the sensor shown in FIG. 1.

BRIEF OUTLINE OF THE EMBODIMENT DISCLOSED

A pulley block is suspended centrally from a transverse frame member. A metallic, non-stretchable wire or cord, as of stainless steel, is anchored to an element substantially fixed in elevation, as the differential, in which an axle is in part journalled. This cord or wire passes over the wheel in the pulley block and is affixed to the rear end of a second contact rod, the cord or wire always maintaining a fixed length. The second contact rod intertelescopes into a tubular member that is externally adjustably threadable through an adjustment lug or nut centrally disposed from a forward transverse frame member. A fully extended compression spring disposes an insulatively encased button, or first contact, rearwardly into proximity of the forward end of the second contact. A tension spring around the tubular member urges the second contact or second contact rod rearwardly. With load placed upon the load supporting area carried by the frame, the conventional leaf springs between vehicle axles and frame are compressed, the pulley block can thus change position forwardly and downwardly, and so that the second contact rod is urged forwardly by the permitted contraction of the tension spring; the cord or wire moving forwardly over the pulley wheel. When the forward end of the second contact (rod) reaches the first contact or button, circuit is closed to render indicia of load or overload.

SPECIFICATION DETAILS

Referring to the drawings, in which like reference numerals are applied to like elements in the various views, a trailer or truck body 10 is shown in broken lines in FIG. 1 having a load supporting or bed area 11 which is affixedly mounted upon or supported upon a frame 12 thereunder. The frame 12 is supported by conventional vehicle leaf spring units or sets 13, one set usually being provided under each corner, or opposed pairs being provided at predetermined longitudinally spaced apart distances under the truck bed, trailer, or drawn vehicle. For purposes of clarity, only one leaf spring unit 13 is shown with a transverse axle 14 passing through the connecting junction 13a at the base or lower most portion of the leaf spring unit 13. Outwardly thereof the axle 14 is supported centrally of a wheel 15, the wheel 15 having the conventional heavy duty tire 16 mounted thereon. Inwardly from the leaf spring junction box 13a the transverse axle 14 is shown passing through, and with its central area journalled in the conventional truck differential 17. Obviously, from this differential 17 the opposed end of the axle 14 extends through an opposite side leaf spring junction box, and outwardly to supply the axle for an opposed tire clad wheels, these elements not being shown for purposes of clarity.

The frame 12 is shown in full line disclosure with two parallel, longitudinally extending structural members, as channels 12a, substantially of truck body or trailer length, transversely spaced apart by similarly constructed, shorter, longitudinally spaced apart front and rear, transverse members or channels 12b. The details of background construction hereinabove described introduce description of the invention. Description details of the effectively operative, and readily calibrated, load or overload sensor 18, clearly shown substantially longitudinally centrally of the hereinabove described background details, may now be given.

Forwardly, centrally under the front channel 12b, a narrow, modified channel 19 is installed, as by nut and bolt means 20. The lower, shortened flange of the channel 19 has a centrally threaded lug or nut 21 with its uppermost surface or face welded to the under side of the shortened flange of the channel portion 19. An externally threaded tube or member 22, hatched for plastic in FIG. 2, comprises part of a first contact carrier 25, has a nut or lug 23 affixed thereto as a handle, the nut or lug 23 serving to have a socket wrench applied thereto to permit ease of rotation of the tubular adjustment member 22 forwardly and rearwardly through the nut or lug 21 in calibration, as will be hereinbelow described.

The first contact carrier 25 includes an insulative flange 26, as of wood, bored centrally, with the first contact button 27 positioned rearwardly of the flange 26, as lodged against the flange rear face around the bore 26a, and from this button or first contact 27 an insulated conductor wire 28 carries circuit forwardly through the flange bore 26a and the handle nut bore 23a to a signal light 29, indicated diagrammatically in FIG. 2. Also, forwardly of the signal light 29 a switch 30 is indicated in the series circuit of the conductor 28, the source of electrical power being indicated as a BATTERY, as the electrical storage battery of the prime mover for the trailer 10. Both the light 29 and switch 30 can best be disposed on the prime mover dashboard, not shown.

A compression spring 31 surrounds the conductor 28 within the externally threaded calibration tubing 22, with the forward end of this compression spring 31 being attached to the handle nut 23, as by welding.

The freely extended compression spring 31, as fully stretched out, bears upon the forward face of the insulative, contact button carrying flange 26, (indicated as of wood in FIG. 2) and receives the guide core 26b of the flange 26 in the forward end thereof. A second contact 32, indicated in FIG. 2 as being of metallic rod stock, is shown with its forward portion slidably disposed in the first contact carrier tubular calibration adjustment member 22. The rear end of the second contact 32 is indicated as comprising a reduced diameter, externally threaded portion 32a, onto which has been threaded a collar 33.

The rearward end of a tension spring 34 is indicated as having its rearward end based against, and spot welded to, the forward face of the collar 33, the tension spring 34 extending around the tubular member 22 and having its forward end based against the rear surface of the lug or nut 21 to which the tension spring 34 may be affixed, as by spot welding, thus to center it for best concentric spacing about, and out of contact with, the tubular adjustment member 22.

A non-stretchable, yieldably bendable cord of metallic wire 36, of substantial strength, as of stainless steel, is shown with forward end passed through a transverse bore 32b in the threaded rear end portion 32a of the contact rod 32, with a keeper latch cylinder 36a adjustably slidable over the cord and the forward end thereof so that the cord 36 is connected with the second contact 32 in manner to be able to follow it forwardly when the tension spring 34 is able to contract, as will be hereinbelow described.

The cord or stainless steel wire 36 extends over the wheel 37a of a conventional pulley or pulley block 37, with an uppermost latch loop 37b thereof having connected thereto the forward end of a corresponding nonstretchable cord or wire 38, with the other end of the wire or cord 38 connected to the rear transverse frame member of channel 12b substantially centrally of the length thereof, as about a pin 38a, shown in FIG. 1. On the other hand, as best shown in FIG. 2, the cord or wire 36, from extending over the pulley wheel 37a, (as journalled for rotation within the pulley block 37), extends substantially vertically downwardly to be anchored about a lug or bolt head 39a of the truck differential block 17.

Slack is taken up in the cord or wire 36 by a loop 36b of the wire 36, passed downwardly through the loop 36c, that effects the anchorage of the cord or wire 36 to the truck differential 39 about the lug or bolt head 39a. The wire of the cord or wire 36, passes through a keeper latch 36d before it passes under and then upwardly through the wire anchoring loop 36c, with free end 36e to pass upwardly and through the conventional keeper latch 36d, shown slid upwardly in FIG. 2 to that position which latches the wire or cord 36 and its free end 36e firmly together. In this manner the effective taut length of the cord or wire 36 is fixed from contact rod end portion bore 32b, over the pulley wheel 37a, and down to differential lug or bolt head 39a.

As described, it is obvious that a calibration of second contact rod travel to effect contact closure, would have to be adjusted when a load is fixed on the load supporting area 11, FIG. 1, corresponding to the load desired to effectuate a signal of contact closure. Then, with this load known and in place in the trailer, the rod 32 could be slid to contact the button 27, as fully extended rearwardly by the compression spring 31, the wire 36 then being set at taut length between rod end 32a and differential 17.

Thus, should it be desired to determine extent of further travel of rod 32 against degrees of overload, this would certainly not plot as a linear curve, but would have to be obtained by empiricism. Should signal of arrival at an upper limit or warning range of overload be desired, a provision for this is indicated in FIG. 2, with contact of a finger 39, extending from conductor 28, with a button 40 closing a parallel circuit through conductor 41 to the exterior which connects in series with parallel indicia, audible or visual, as a light 42, cut in parallel with the contact closure indicating light 29, as by closure of a switch 43. With this arrangement, with light 29 on and light 42 off, the vehicle trailer would be loaded but not overloaded. Then, with both lights on, the operator of the prime mover would be appraised of dangerous overload.

The member 22, part of the first contact carrier, is shown in FIG. 2 as made of plastic, insulative material. However, since it is recited that the wire 36 is metallic, ground circuit from the contact bar or rod 32 is through the wire 36 to the conventionally metallic nut 39a and differential 17, and also through the collar 33 and tension spring 34 to the frame connected lug 21. Optionally, an insulative bushing 35 may be press-fitted into the collar 33 and the second contact rod end 32a threaded through this insulative bushing. Then, in FIG. 2, ground circuit would pass through the wire 36 to the differential 17. Also optionally, without use of the bushing 35, but with insulation interposed between the wire 36 and rod end 32a, ground circuit would pass only through the collar 33 and tension spring 34. Another facet affecting ground circuitry could arise should the tabular member 22, shown of plastic, be comprised of metal. In this case, another troublesome ground circuit would pass through the tubular member 22 and lug 21 to the frame.

As the tubular member 22 in FIG. 2 is shown of plastic, while the nut 23 is indicated as of metal, the problem of connection of the member 22 and nut 23 is indicated as solved at 22a, the forward end of the member 22 being threaded to a sufficient extend into the rear portion of the nut 23, as to effect solid engagement, with engagement further insured, as by a pin, not shown, or by expoxy resin bonding of member 22 to the rear face of the nut 23.

No such open, easily accessible device has yet entered the prior art. A swingable pulley block has a fixed length, non-stretchable cable thereover, the cable being connected to first contact. The second contact is extended by a compression spring that is yieldably responsive to overload, while enumeration of effective elements is completed by describing a tension spring that urges the first contact toward contact closure responsive to load being placed on the load supporting area.

Many other variations and arrangements can be made on basis of the disclosures of FIGS. 1 and 2 as introductory, and many alternative and correspondingly similar arrangements that made may be considered as falling within the broad spirit of the invention. The appended claims are by way of introduction, and by amendment could be entitled to be broadened rather than being made more specific.

If it is desired that the tubular member 22 comprise the only ground circuit, then this member should be of metal, while an insulative bushing 35, broken lines, FIG. 2, will form the center of the collar 33, through which the rear portion 32a is threaded. In this case the wire 36 will be insulatively connected to the rod threaded end 36a.

I claim:

1. A load or overload sensor for a frame supported, load supporting area, said frame being yieldably supported, as by leaf spring means above vehicle axle means, said sensor including a frame carried, first contact carrier, horizontally, longitudinally adjustable with relation to said frame and carrying compression spring means at maximum extension disposing an insulative first contact positioning means that disposes said first contact for closure with a second contact of said sensor responsive to downward movement of load supporting area and frame corresponding with a predetermined elevation, said second contact being carried by a second contact carrier including a connection means with the rear end of a tension spring connected thereto, the forward end of said tension spring being yieldably connected to said frame, a frame suspended pulley and a second contact connected cable means passing over said pulley and affixed to vehicle axle journal means, insulative conductor means carrying circuit from said first contact to indicia means, actuated upon contact closure, to render load indication, said first contact positioning means being horizontally slidable with relation to said first contact carrier and said compression spring being yieldably urged in contraction responsive to further increase in load after circuit closure between said first and second contacts.

2. A sensor as claimed in claim 1, in which the vehicle axle journal means to which said cable means is affixed, comprises a truck differential through which passes a vehicle axle.

3. A sensor as claimed in claim 1, in which said cable means is insulatively connected to said second contact.

4. A sensor as claimed in claim 1, in which said cable means is adapted for adjustment in length, whereby to calibrate said sensor.

5. A sensor as claimed in claim 1, in which said second contact carrier includes a metallic collar into which said second contact is threadable, whereby to calibrate said sensor.

6. A sensor as claimed in claim 1 in which said first contact carrier includes tubular means surrounding said first contact and threadable through a frame included member, whereby to calibrate said sensor.

7. A sensor as claimed in claim 1, in which said second contact carrier includes insulative means interposed between said second contact and said tension spring, and in which ground circuit is completed from said second contact through said cable means.

8. A sensor as claimed in claim 1, in which said indicia means comprises a light.

9. A sensor as claimed in claim 1, in which said sensor circuit is empowered by a prime mover vehicle battery.

10. A sensor as claimed in claim 1, in which said first contact carrier comprises an externally threaded tubular, insulative portion that provides said longitudinal, horizontally adjustable calibration.

11. A sensor as claimed in claim 1, which additionally includes additional indicia means actuated after circuit closure upon compression spring compressions to render overload indication.

* * * * *